Nov. 2, 1965  R. F. TUREK  3,215,057
ARTIFICIAL ATMOSPHERE SYSTEM
Filed Aug. 31, 1962  4 Sheets-Sheet 1

FIG. 1

INVENTOR.
ROBERT F. TUREK
BY
ATTORNEYS

FIG.3

Nov. 2, 1965 R. F. TUREK 3,215,057
ARTIFICIAL ATMOSPHERE SYSTEM
Filed Aug. 31, 1962 4 Sheets-Sheet 4

United States Patent Office 3,215,057
Patented Nov. 2, 1965

3,215,057
ARTIFICIAL ATMOSPHERE SYSTEM
Robert F. Turek, Windsor Locks, Conn., assignor to United Aircraft Corporation, East Hartford, Conn., a corporation of Delaware
Filed Aug. 31, 1962, Ser. No. 220,838
17 Claims. (Cl. 98—1.5)

This invention relates to a system for providing a habitable artifical atmosphere in a sealed compartment or other enclosure and, more particularly, to a control system for regulating the introduction of oxygen and a secondary gas to such a compartment or enclosure.

It is the general object of the invention to provide a control system of the type mentioned which employs an "on-off" method of control and which provides substantial advantage in the attainment of a high degree of accuracy, reliability, and simplicity.

In fulfillment of this object, a control system is provided wherein valves of the "on-off" rather than the modulating type are employed. The valves are controlled in their operation so as to provide for the introduction of oxygen and a secondary gas in "pulse" form and so as to maintain a preselected minimum partial pressure of oxygen and preselected minimum and maximum total pressures in the compartment. Thus, an artificial atomsphere is regulated so as to be habitable in a desirably simple and yet precise and reliable manner. Additionally, various other secondary objects are fulfilled in the control of the valve's operation and in the provision of other elements.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
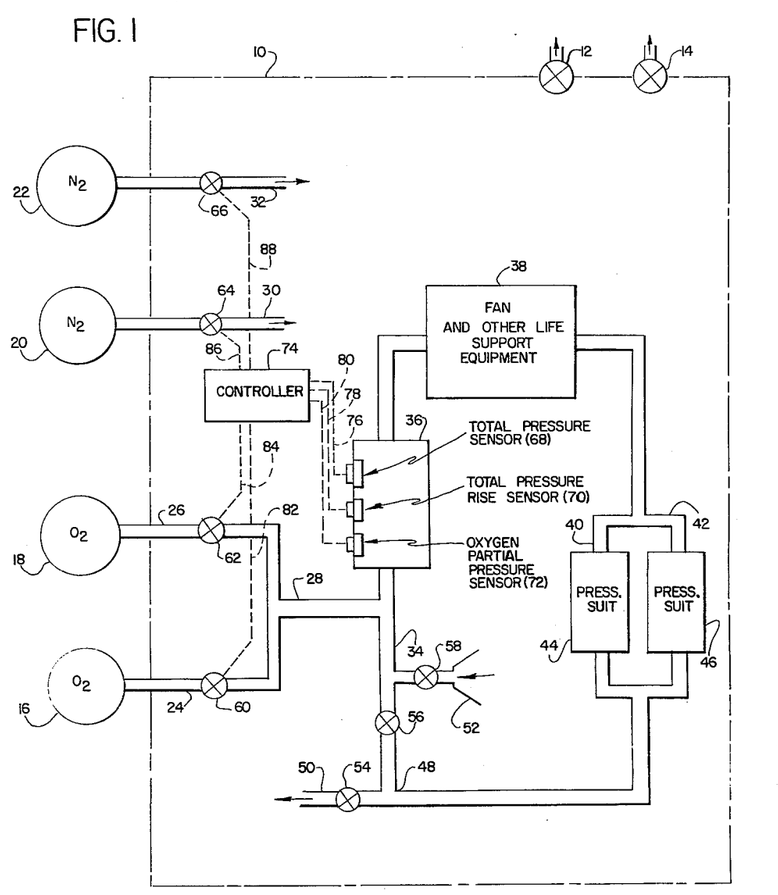
FIG. 1 is a diagrammatic illustration of an artificial atmosphere supply and control system, the latter forming a preferred embodiment of the present invention.

Referring now particularly to FIG. 1, it will be observed that a broken line 10 may represent a sealed compartment or other enclosure such as may be provided in a spacecraft or the like. The compartment or enclosure 10 may be provided with outflow valves such as a relief valve 12 and a safety valve 14. While the valves 12 and 14 may find their principal use during ascent and descent of the vehicle, they may also find use, albeit somewhat more limited, during other phases of a flight or mission. The valves 12 and 14 may be of known construction and form no essential part of the invention, but it should be noted that their mode of operation is such that they do not ordinarily vent the compartment or enclosure 10 when the control system of the present invention is in operation as described hereinbelow. That is, for purposes of the discussion which follows, the compartment or enclosure 10 may be regarded as sealed with gases of the artificial atmosphere escaping only by leakage. Additionally, it may be noted at this point that the compartment or enclosure is of a fixed or constant volume.

First and second sources of oxygen under pressure are shown respectively at 16 and 18 and first and second sources of a secondary gas under pressure are shown respectively at 20 and 22. The secondary gas is shown as nitrogen but it should be observed that various other gases may be employed either individually or in mixed form. Gas sources are dual as shown in accordance with the presently preferred practice but it will be seen that the control system of the present invention is equally adaptable to supply systems employing single sources and systems employing more than two sources of each of a plurality of gases. Additional features of safety and reliability are attained when more than one source of each gas is provided. The gas sources shown represent cryogenic tank supplies which may include known accessories such as heating means but the invention is not so limited.

In accordance with the invention, first and second fluid passageway means are provided for the introduction of oxygen to the compartment or enclosure 10 from the sources 16 and 18. Such passageways may take the form of branch conduits 24 and 26 connected respectively with the oxygen sources 16 and 18 and a main supply conduit 28 connected with the branch conduits. First and second fluid passageway means or conduits 30, 32 are also provided respectively for introducing nitrogen or another secondary gas to the compartment from the first and second sources 20 and 22. As shown, the nitrogen supply conduits 30 and 32 discharge directly to the compartment or enclosure 10 while the oxygen supply conduits 24 and 26 are arranged for indirect discharge to the compartment.

The main oxygen supply conduit 28 is shown connected with a loop conduit 34 which in turn extends to a sensor compartment 36 for the introduction of oxygen thereto. From the sensor compartment 36 the oxygen flows in the loop conduit 34 to a compartment 38 which may contain a fan and other life support equipment such as devices for removing carbon dioxide and water and cooling devices. Such devices form no part of the present invention and need not be described herein. From the compartment or devices 38 oxygen flows through the loop conduit 34 to branch conduits 40, 42 associated respectively with first and second pressure or space suits 44 and 46. Finally, the loop is completed at a junction 48 where the conduit 34 meets with an exhaust conduit 50. An inlet conduit 52 is also associated with the loop conduit 34 as are valves 54, 56 and 58 disposed respectively in the exhaust conduit 50, in the loop conduit 34 between the exhaust and inlet conduits 50 and 52, and in the inlet conduit 52.

Now from the foregoing it will be apparent that oxygen is supplied indirectly to the compartment or enclosure 10 and that the selective discharge of oxygen to the compartment is provided for. The valves 54, 56 and 58 may be regarded as manually operable for the present discussion. With the valves 54 and 58 closed and with the valve 56 open, oxygen will flow in the loop conduit 34 through the sensor compartment 36, the compartment 38 and the pressure or space suits 44 and 46. Alternatively, with the valve 56 closed, and with the valves 54 and 58 open, oxygen will flow through the compartments 36 and 38, the pressure or space suits 44 and 46, and through the exhaust conduit 50 into the compartment or enclosure 10. During this phase of operation compartment gases are free to flow through the inlet conduit 52 for intermixture with the oxygen flowing in the loop conduit 34.

During the operational phase when oxygen flows through the space suits 44 and 46 and is confined in the loop conduit 34, adequate control may be exercised merely by maintaining a minimum total pressure in the loop. Thus, valves such as first and second oxygen valves 60 and 62 disposed in the conduits 24 and 26 may be controlled in their operation as by means of a total pressure sensor not shown. This operational phase may be regarded as an abnormal or emergency phase and obviously requires that the compartment occupants be enclosed in the space suits 44 and 46 and not free for unincumbered movement about the compartment.

The alternative operational phase wherein the loop conduit 34 is open to the cabin represents the principal interest of the present invention. During this phase a habitable artificial atmosphere is maintained throughout the compartment 10 through operation of the control system of the invention and the space suits and other compartments associated with the loop conduit 34 may be regarded merely as portions of an oxygen supply conduit for the compartment 10.

As mentioned, the valves of the present control system are of the "on-off" or "open-close" type and they do not meter flow in accordance with a variable schedule. Thus, the valves 60 and 62 are operable to introduce "pulses" of oxygen to the compartment 10. The amount of oxygen in each "pulse" is of course determined by the length of time during which the valve remains open, or more specifically, the quantity or amount of oxygen in each pulse is proportional to the total pressure rise resulting therefrom in the compartment 10. The valves 60 and 62 may take a variety of forms and may for example be of the solenoid operated type. First and second nitrogen valves 64 and 66 in the conduits 30, 32 may be similar to the valves 60, 62 in construction and operation.

Referring again to the sensor compartment 36, it will be observed that there is provided therein a total pressure sensor 68, a total pressure rise sensor 70, and an oxygen partial pressure sensor 72. The said sensors or pressure sensitive devices are connected respectively with a controller 74 as indicated schematically by broken lines 76, 78 and 90. Additionally, each of the valves 60, 62, 64 and 66 is connected with the controller 74 as indicated schematically at 82, 84, 86 and 88. It will be apparent that the several sensors 68, 70 and 72 will be subjected to the pressure conditions of the artificial atmosphere in the compartment 10 with the loop conduit 34 in the aforementioned open condition.

Figure 2:
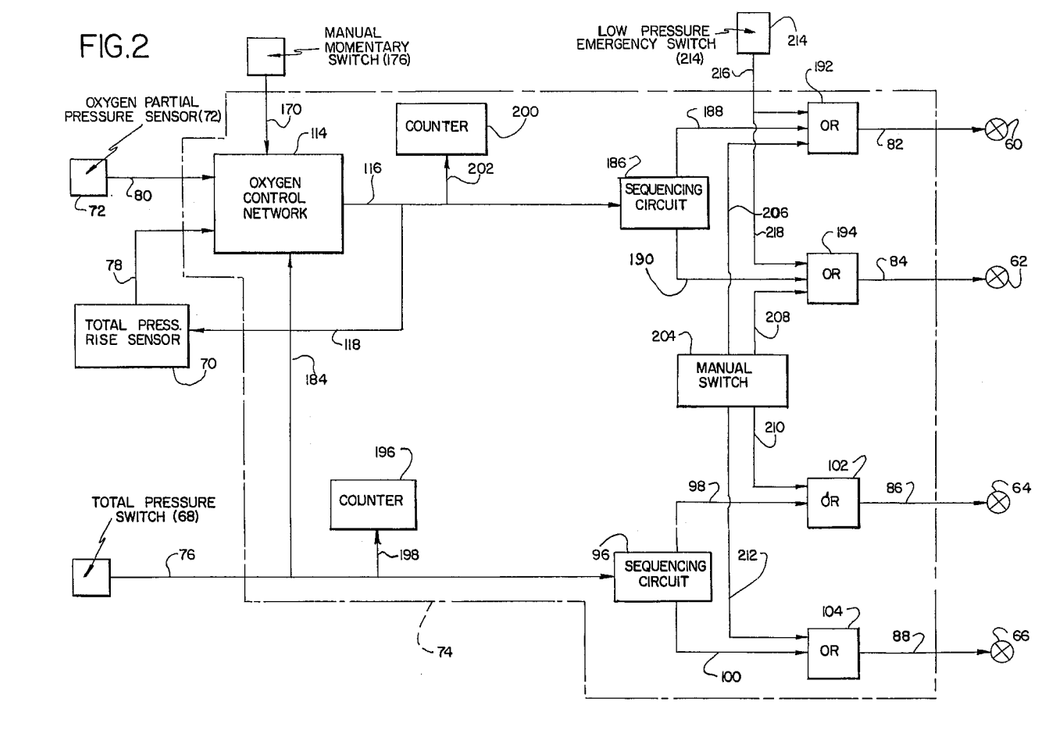
FIG. 2 is a diagrammatic illustration of the control system showing the elements thereof in greater detail.

Referring now particularly to FIG. 2, it will be observed that the controller 74 is represented as disposed within a broken line. The first and second oxygen valves 60 and 62 are shown connected therewith respectively by the lines 82 and 84 and the first and second nitrogen valves 64 and 66 are shown connected respectively with the controller by the lines 86 and 88. The aforementioned oxygen partial pressure sensor 72 is shown connected with the controller by a line 80, the total pressure rise sensor or first total pressure sensitive device 70 is shown connected with the controller 74 by the line 78, and the second total pressure sensitive device or total pressure sensor 68 is connected with the controller by the line 76.

Figures 4, 5:
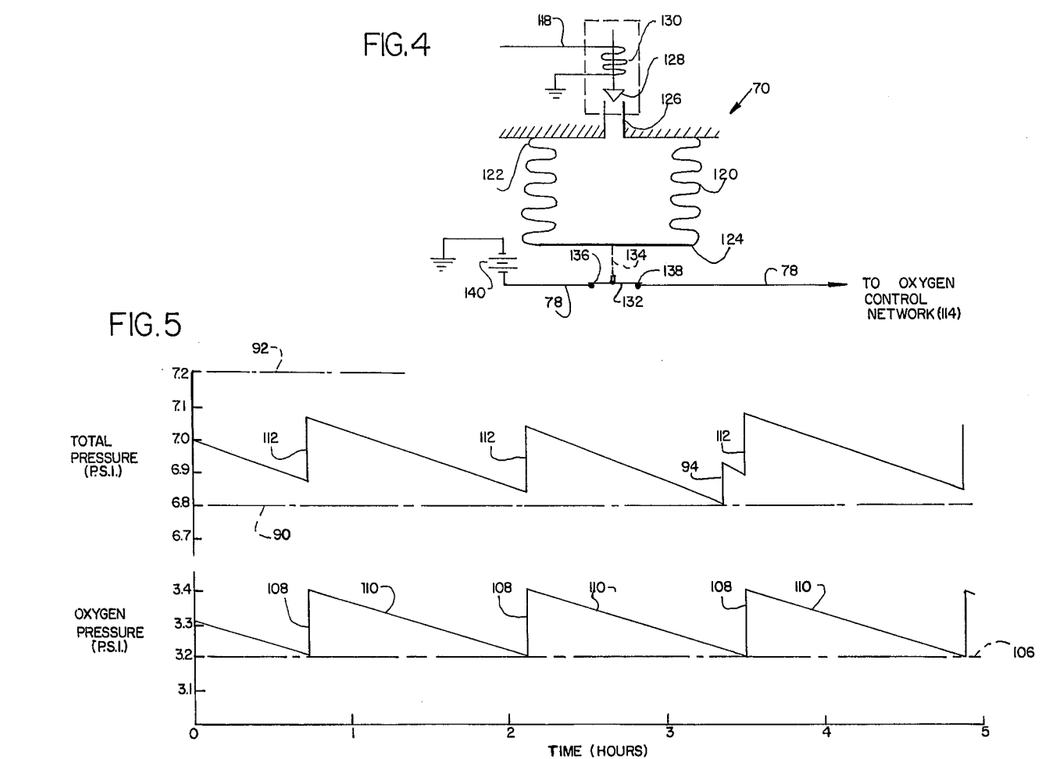
FIG. 4 is a schematic representation of a pressure rise sensitive device forming a part of the control system.
FIG. 5 is a curve showing the time and pressure relationship of pulses of oxygen and nitrogen.

In accordance with the invention the nitrogen valves 64 and 66 are intermittently opened to emit pulses of nitrogen and to thereby maintain total pressure in the compartment or enclosure 10 between preselected minimum and maximum levels. Thus, for example, it may be desired to maintain the total compartment pressure between minimum and maximum levels of 6.8 and 7.2 p.s.i. as indicated by broken lines 90 and 92 on the curve of FIG. 5. As will be explained more fully hereinbelow, this is preferably accomplished by providing for an intermittent nitrogen pulse of a pressure rise value substantially less than the .4 p.s.i. interlimit spread. The short vertical line 94 in FIG. 5 represents such a nitrogen pulse and it will be observed that merely a .1 p.s.i. total pressure rise is employed. That is, provision is made to increase compartment total pressure to 6.9 p.s.i. whenever the pressure drops to the minimum level of 6.8 p.s.i.

Returning now to FIG. 2, it will be apparent that the total pressure sensitive device or sensor 68 need merely open and close one of the nitrogen valves 64 and 66 respectively at 6.8 and 6.9 p.s.i. in order to fulfill the foregoing requirements. Thus, the total pressure sensor 68 need merely comprise a simple "on-off" device capable of emitting a first signal when compartment total pressure drops below 6.8 p.s.i. and capable of emitting a second signal when the said pressure exceeds 6.9 p.s.i. Various well-known pressure sensitive devices may be employed for this purpose and detailed description is unnecessary. However, for purposes of illustration, it may be assumed that the sensor 68 includes an electrical switch means operable to provide a positive voltage signal whenever total pressure drops below 6.8 p.s.i. and operable to terminate such signal whenever total pressure exceeds 6.9 p.s.i.

The valves 64 and 66 are operated selectively under the control of the sensor 68 and, more specifically, the said valves are operably connected sequentially with said sensor as by means of a sequencing or switching network 96. The sequencing or switching network 96 may take various well-known forms and need not be described in detail. It is sufficient to note that the said network receives all signals from the sensor 68 through the line 76 and that the network passes such signals sequentially through first and second lines 98 and 100 respectively. The said signals pass from the lines 98 and 100 respectively through "or" networks 102 and 104 and thence through the lines 86 and 88 to the valves 64 and 66. The "or" networks 102 and 104 may take various known forms and need not be described in detail.

Now from the foregoing it will be apparent that a compartment total pressure below 6.8 p.s.i. will result in a positive voltage signal in the line 76 to the sequencing or switching network 96. The said network will pass the signal to one of the lines 98 and 100, thence through one of the "or" networks 102 and 104 and one of the lines 86 and 88 to open one of the nitrogen valves 64 and 66. Termination of the positive voltage signal at the sensor 68 will occur when the compartment pressure has reached 6.9 p.s.i., and the open nitrogen valve will close. Thereafter, with the passage of time and the leakage of gases from the compartment, the total pressure may again drop below 6.8 p.s.i. When this occurs a similar operation will be repeated but the nitrogen valve previously opened will remain closed and its counterpart will be opened and then closed on attainment of a 6.9 p.s.i. compartment total pressure. Thus, it will be seen that equalization of the drain on the two nitrogen tanks or sources 20 and 22 is provided for in the sequential operation of the nitrogen valves 64 and 66.

Turning again to FIG. 5 and referring to the lower portion thereof, it will be observed that an exemplary system may be required to maintain an oxygen partial pressure in the compartment 10 above a minimum level of 3.2 p.s.i. The broken line 106 represents such a limit while the vertical lines 108, 108 represent pulses of oxygen introduced to the compartment, and the inclined lines 110, 110 represent the decay or dissipation of oxygen partial pressure with the passage of time. It will be observed that each oxygen pulse effects a partial pressure rise of .2 p.s.i. (3.2 to 3.4 p.s.i.) and this increase is of course reflected in total compartment pressure by the vertical lines 112, 112 in the upper portion of FIG. 5. In accordance with the invention, the introduction of oxygen to the compartment 10 is so controlled as to provide a preselected total pressure rise increment for each pulse. The increment of pressure rise may of course vary but as shown a .2 p.s.i. rise is provided for in the system shown and the operation of the valves 60 and 62 will be so described.

Prior to a discussion of the operation of the oxygen valves, the interrelationship of the oxygen and nitrogen pulses should be noted. Recalling that a .4 p.s.i. spread exists between the lower and upper total pressure limits 90, 92, the reason for the .1 p.s.i. nitrogen pulse and the .2 p.s.i. oxygen pulse will now be apparent. The said pulses cooperate to maintain compartment total pressure between the selected limits and yet no combination of pulses, irrespective of their timed relationship, can result in an over or under pressure condition in the compartment or enclosure.

Further in accord with the present invention, the oxygen valves 60 and 62 are controlled in their opening operation by means of the oxygen partial pressure sensitive device or sensor 72 while their closing operation is under the control of the total pressure rise sensor or device 70. Thus, the difficulties encountered in attempting to vary oxygen flow under the control of an oxygen partial pressure sensor are avoided and the said sensor is employed merely to provide an "on-off" signal or, more specifically, to provide a signal when oxygen partial pressure drops to or below 3.2 p.s.i. As is well known, present state of the art oxygen partial pressure sensors are relatively slow acting. When used in the manner stated, the comparatively long response time of such a sensor poses no problem. Decay or dissipation of oxygen partial pressure is relatively slow under normal conditions as illustrated by the inclined lines 110, 110 in FIG. 5.

While other sensors or partial pressure sensitive devices may be employed, it is presently preferred to utilize an electrochemical sensor such as a "Beckman Polarographic Sensor" of the type described in U.S. Patent 2,913,386. For purposes of illustration, it may be noted that the sensor can be arranged to provide a positive voltage signal when compartment oxygen partial pressure is above the 3.2 p.s.i. limit and that the sensor can operate to terminate such signal when the partial pressure drops below the said limit. Thus, an oxygen control network 114 receives a positive voltage signal through the line 80 when oxygen partial pressure in the compartment 10 is above 3.2 p.s.i. When the partial pressure drops to or below the said limit, the signal to the control network 114 becomes a negative or "no signal" condition.

The aforementioned total pressure rise sensor 70 is operable to emit a signal when compartment total pressure has risen .2 p.s.i. after opening of an oxygen valve 60, 62. As shown in FIG. 2, the sensor 70 is connected with an output line 116 from the oxygen control network 114 by means of a line 118. As will be seen, a positive voltage signal is provided in the lines 116 and 118 by the oxygen control network 114 when a suitable positive voltage signal is received from the partial pressure sensor 72. The voltage signal in the line 118 to the sensor 70 serves to actuate the same whereupon compartment total pressure is sensed thereby and the sensor is conditioned to emit a signal through the line 78 to the control network 114 on attainment of the preselected total pressure rise of .2 p.s.i.

In FIG. 4 there is shown schematically a total pressure rise sensor 70 operable to provide the above-mentioned function. The sensor comprises a bellows 120 fixedly supported at one end 122 and free to move at an opposite end 124. A vent conduit 126 for the bellows 120 has associated therewith a solenoid operated valve 128 and a solenoid coil 130 is operatively connected with the aforementioned line 118 extending from the oxygen control network line 116. At its free and movable end 124, the bellows 120 is connected with a switch member 132 by means of a link 134. The switch member 132 is normally closed to interconnect contacts 136 and 138 in the aforementioned line 78 which extends at its right-hand end to the oxygen control network 114 and which may be provided at its left-hand end with a source of positive voltage as at 140.

The operation of the pressure rise sensor will be apparent from the foregoing. The solenoid operated valve 128 may be moved to close the vent conduit 126 on receipt of a positive voltage signal at the coil 130 via the line 118. On closing of the vent conduit 126, gases are trapped within the bellows 120 at the then existing total compartment pressure. On occurrence of a preselected total pressure rise (.2 p.s.i.) the bellows 120 will contract sufficiently to move the switch member 132 upwardly and to break the electrical connection between the contacts 136 and 138. Thus, it will be seen that a positive voltage signal is provided by the line 78 to the oxygen control network 114 prior to attainment of the preselected total pressure rise. When the selected rise has occurred the positive voltage signal to the oxygen control network is terminated.

Figure 3:
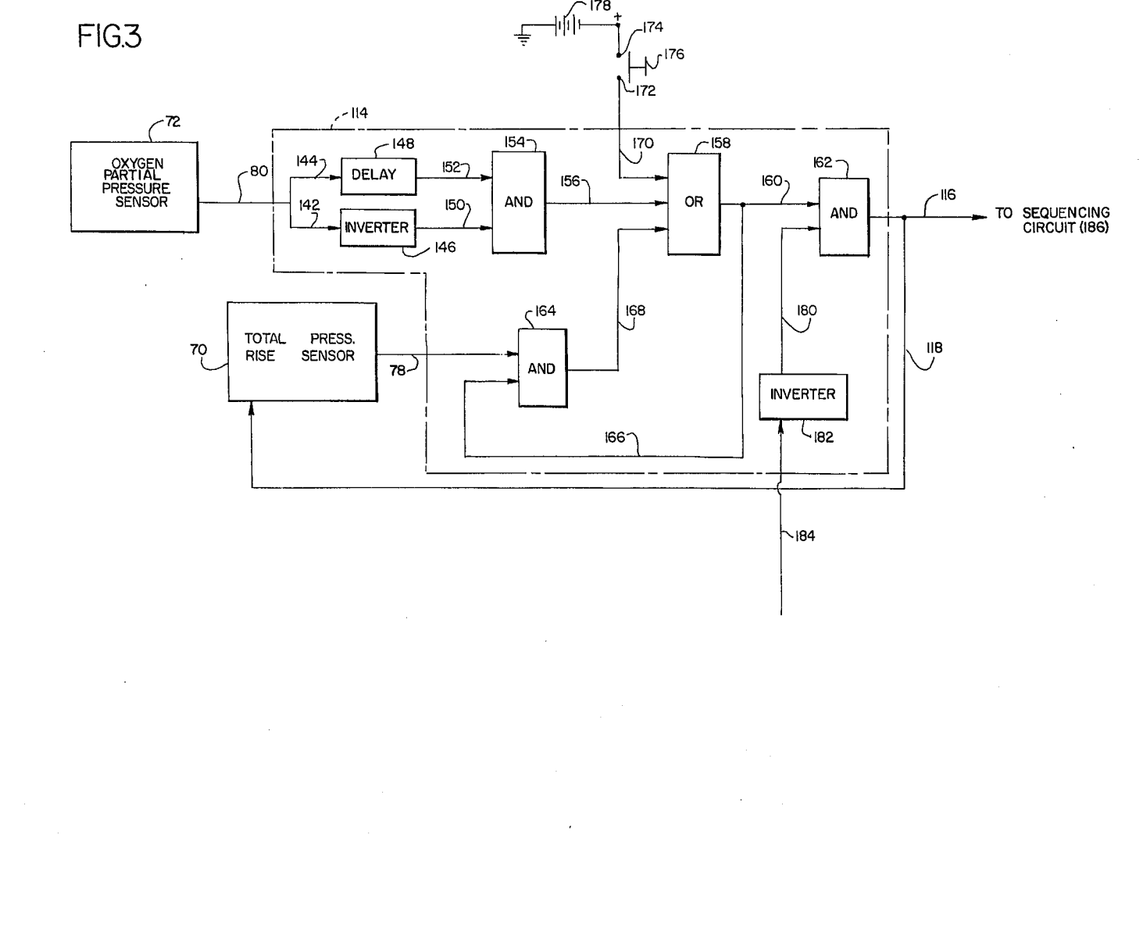
FIG. 3 is still another diagrammatic illustration showing a portion of the control system of FIG. 2.

Referring now to FIG. 3, it will be observed that the oxygen control network 114 is indicated as disposed within a broken line. The aforementioned line 80 from the oxygen partial pressure sensor 72 extends to branch lines 142 and 144 respectively connected with an inverter 146 and a delay network 148. Output lines 150 and 152 from the inverter and delay networks extend to an "and" network 154 and an output line 156 extends from the said network to an "or" network 158. A line 160 from the "or" network 158 extends to a second "and" network 162 and the aforementioned output line 116 of the oxygen control network is connected with the said "and" network 162. The aforementioned total pressure rise sensor 70 is shown connected with the lines 118 and 78 as mentioned above and the latter extends to a third "and" network 164. Also extending to the "and" network 164 is a line 166 connected at its opposite end with the line 160. An output line 168 from the "and" network 164 third input line 170 for the "or" network 158 extends to a pair of contacts 172, 174 associated with a manually operable switch 176 and thence to a source of positive voltage 178. The "and" network 162, in addition to the line 160, has connected thereto a line 180 which extends from an inverter 182. Extending to the inverter 182 is a line 184 which leads from the aforementioned line 76 as best shown in FIG. 2.

All of the circuits and networks comprising the delay and inverter circuits 148 and 146, the "and" networks 154, 162 and 164, the "or" network 158, and the inverter 182 are well known and need not be described in detail herein. The manner in which they operate in relation to each other is set forth herein-below.

Consider initially a condition wherein the partial pressure sensor 72 is satisfied, i.e., the oxygen partial pressure is above 3.2 p.s.i. as illustrated in FIG. 5. As stated above the sensor 72 emits a positive voltage signal under such a condition. This signal is received at the "and" network 154 via the lines 80, 144, the delay circuit 148, and the line 152. The signal through the line 142 and through the inverter 146 and the line 150 reaches the "and" network 154 as a negative voltage signal or as a "no signal" condition. Thus, the "and" network 154 is inoperative to pass a signal to the line 156. Operation of the oxygen valves does not occur.

If the sensor 72 now becomes unsatisfied, the signal emitted thereby will go to a negative or "no signal" condition. The signal to the "and" network 154 via the lines 142 and 150 and the inverter 146 will immediately become a positive signal. On the other hand, the signal through the lines 144 and 152 and the delay circuit 148 will be delayed and a continuing positive signal will be supplied initially to the "and" network 154. Receipt of the two positive signals will cause the "and" network 154 to operate and to transmit a signal to the line 156 and to the "or" network 158. The said network will in turn pass the signal via the line 160 to the "and" network 162. If the aforementioned total pressure sensor 68 is satisfied there will be a negative or a "no signal" condition in the line 76 and in the line 184 and this will become a positive signal at the "and" network 162 by reason of the operation of the inverter 182. Thus, if the nitrogen valves are not open, a signal will be passed through the line 116 and one of the oxygen valves 60, 62 will be opened. If, on the other hand, there is a positive signal in the lines 76 and 184 indicating that a nitrogen valve is open, a negative or a "no signal" condition will exist in the line 180 and the oxygen control network will be inoperative to open an oxygen valve. Thus, the pressure rise sensor 70 will "feel" a pressure rise attributable to the introduction of oxygen only and there will be no possibility of error in the operation of the sensor as might occur if both oxygen and nitrogen were introduced to the compartment 10 simultaneously.

Considering once again the transmission of a valve opening signal to the "and" network 154, it will be observed that the positive signal at the line 152 will go negative or to a "no signal" condition after a short delay. In order to prevent a resulting premature closing operation of the oxygen valve, provision is made so that the pressure rise sensor 70 will take over control of the valve immediately upon opening of the same. When the valve opening signal passes through the line 160 it is also carried through the line 166 to the "and" network 164. As mentioned, the line 78 provides a positive signal to the "and" network 164 prior to satisfaction of the pressure rise sensor 70. Thus, the "and" network 164 will transmit a signal through the line 168 to the "or" network 158 to hold the oxygen valve open irrespective of the duration of the valve opening signal from the partial pressure sensor 72. It should be noted also that the line 118 passes a positive signal to the pressure rise sensor 70 and particularly to the coil 130 of its solenoid whereby to close the valve 128 on opening of the oxygen valve. The pressure rise sensor is thus armed or actuated, and when a .2 p.s.i. total pressure rise has been achieved, the bellows 120 therein will urge the switch member 132 downwardly whereby to terminate the signal through the line 78 to the "and" network 164. This of course terminates the signal through the line 168, the "or" network 158, the line 160, the "and" network 162, and the line 116, and the oxygen valve thereupon closes.

In addition to the foregoing, the oxygen control network 114 includes provisions which guard against inadvertent or accidental operation of an oxygen valve caused by improper mixing of gases in the compartment or enclosure 10. If, for example, an oxygen valve should be opened and discharge directly on the partial pressure sensor 72, it would be expected that the sensor would achieve a satisfied condition quite rapidly even though the proper amount of oxygen had not yet been introduced to the compartment. As stated, the control is so constructed and arranged that the total pressure rise sensor 70 takes over control of the oxygen valve shortly after opening of the valve. Thus, a "false" signal of satisfaction from the partial pressure sensor cannot have the effect of a premature closing of the valve.

Secondly, it may be possible under some circumstances that mixing of oxygen and nitrogen in the compartment will require such an extended period of time that the partial pressure sensor will remain unsatisfied even after the required total pressure rise has been achieved and the sensor 70 has terminated its signal through the line 78 calling for a closing operation of the oxygen valve. In this event, the signal to the "and" network 154 through the line 150 will be a continuing positive signal calling for opening of the oxygen valve. The delay period of the delay circuit 148 will, however, have long since passed and the signal to the "and" network through the line 152 will be a negative or "no signal" condition. Thus, the "and" network 154 will not pass a signal through the line 156 for opening of the oxygen valve. Only upon a subsequent satisfied and unsatisfied condition of the partial pressure sensor will the oxygen control network again be capable of opening the oxygen valve.

Finally with regard to FIG. 3, it is to be noted that a positive and oxygen valve opening signal can be supplied to the "or" circuit 158 through operation of the manual switch 176. The said switch may be situated in the compartment for operation by an occupant when a single pulse of oxygen is desired.

Returning now to FIG. 2, it will be observed that the line 16 from the oxygen control network 114 extends to a sequencing or switching circuit 186. Said circuit has output lines 188 and 190 extending respectively to "or" networks 192 and 194, the latter being connected respectively with the oxygen valves 60, 62 via lines 82 and 84. The sequencing and "or" networks and the lines 188 and 190 may operate to provide for sequential operation of the oxygen valves 60 and 62 in the manner described above for the nitrogen valves 64 and 66.

In accordance with the presently preferred practice there is also provided a means for counting nitrogen pulses or openings of the nitrogen valves 64 and 66. Said means may comprise a counter 196 of known construction connected with the aforementioned line 76 by a line 198. The counter 196 may be employed in ascertaining the amount of nitrogen remaining in the tanks or sources 20 and 22 and the frequency of nitrogen pulses may be observed to provide an indication of leakage rate from the compartment or enclosure. Similarly, an oxygen pulse counter 200 may be provided and connected with the line 116 by a line 202. The counter 200 may be particularly useful when the system is in the aforementioned phase of operation wherein the loop conduit 34 is closed and the occupants of the compartment or enclosure are in their pressure or space suits 44, 46.

Still referring to FIG. 2, it is to be noted that a manual valve selector switch is provided at 204. The switch 204 is connected with the aforementioned "or" networks 192, 194, 102 and 104 respectively by lines 206, 208, 210 and 212. In the event that manual control over the introduction of oxygen and/or nitrogen is desired an occupant of the compartment or enclosure may achieve the same by suitable manipulation of the switch 204. For example, the said switch may take the form of a simple five position switch with one position serving as an "off position" and with the remaining four positions serving to connect power respectively with the lines 206, 208, 210 and 212.

Finally, there may be provided a low pressure emergency switch 214. The switch 214 is shown connected with the "or" networks 192 and 194 by lines 216 and 218 respectively and may comprise a pressure sensitive switch of known construction and which is operable automatically to open one or both of the oxygen valves 60 and 62 via the "or" networks 192 and 194. Emergency conditions such as a puncture in the wall of the compartment may trigger operation of the switch 214.

From the foregoing it will be apparent that a simple and yet highly accurate and reliable artificial atmosphere control system has been provided. The "on-off" method or theory of control employed throughout provides for desirably low power requirements. Manual override provisions are accomplished with a minimum of difficulty. The necessity of metering extremely low flows in accordance with complex schedules is wholly eliminated as oxygen and nitrogen valves are either fully open or fully closed at all times. The amounts of oxygen and nitrogen remaining in storage are readily determined through the use of simple counters and leakage rate is similarly capable of ready detection. Finally, the "on-off" controls are highly desirable due to their inherent stability and due to the elimination of dependence on the relatively slow response time of oxygen partial pressure sensors.

The invention claimed is:

1. A system adapted to provide a habitable artificial atmosphere in a sealed compartment, said system comprising a source of oxygen under pressure, first fluid passageway means adapted to connect said source with the compartment, a source of a secondary gas under pressure, second fluid passageway means adapted to connect said secondary gas source with the compartment, first and second valves respectively in said first and second passageway means, and control means connected with said first valve and including an oxygen partial pressure sensitive device and a total pressure rise sensitive device adapted to be disposed in the compartment, said control means being operable under the control of said pressure sensitive devices to open and close said first valve respectively on occurrence of a compartment oxygen partial pressure below a preselected level and on occurrence of a preselected compartment total pressure rise following opening of the first valve.

2. A system adapted to provide a habitable artificial atmosphere in a sealed compartment and in a space suit located in the compartment, said system comprising a source of oxygen under pressure, first fluid passageway means adapted to connect said source with the space suit in the compartment and thereby connect said source indirectly with the compartment, a source of a secondary gas under pressure, second fluid passageway means adapted to connect said secondary gas source with the compartment, first and second valves respectively in said first and second passageway means, and control means connected with said first valve and including an oxygen partial pressure sensitive device and a total pressure rise sensitive device adapted to be disposed in the compartment, said control means being operable under the control of said pressure sensitive devices to open and close said first valve respectively on occurrence of a compartment oxygen partial pressure below a preselected level and on occurrence of preselected compartment total pressure rise following opening of the first valve.

3. A system adapted to provide a habitable artificial atmosphere in a sealed compartment, said system comprising first and second sources of oxygen under pressure, first and second fluid passageway means respectively adapted to connect said oxygen sources with the compartment, a source of a secondary gas under pressure, third fluid passageway means adapted to connect said secondary gas source with the compartment, first and second valves disposed respectively in said first and second passageway means, a third valve in said third passageway means, and control means connected with said first and second valves and including an oxygen partial pressure sensitive device and a total pressure rise sensitive device adapted to be disposed in the compartment, said control means being operable under the control of said pressure sensitive devices and being operably connected sequentially with said first and second valves, each of said first and second valves when operably connected with said control means being opened and closed thereby respectively on occurrence of a compartment oxygen partial pressure below a preselected level and on occurrence of a preselected compartment total pressure rise following opening of the first and second valves.

4. A system adapted to provide a habitable artificial atmosphere in a sealed compartment, said system comprising a source of oxygen under pressure, first fluid passageway means adapted to connect said source with the compartment, a source of a secondary gas under pressure, second fluid passageway means adapted to connect said secondary gas source with the compartment, first and second valves respectively in said first and second passageway means, control means connected with said first valve and including an oxygen partial pressure sensitive device and a total pressure rise sensitive device adapted to be disposed in the compartment, said control means being operable under the control of said pressure sensitive devices to open and close said first valve respectively on occurrence of a compartment oxygen partial pressure below a preselected level and on occurrence of a preselected compartment total pressure rise following opening of the first valve, and counter means operatively connected with said control means for registering openings of said first valve.

5. A system adapted to provide a habitable artificial atmosphere in a sealed compartment, said system comprising a source of oxygen under pressure, first fluid passageway means adapted to connect said source with the compartment, a source of a secondary gas under pressure, second fluid passageway means adapted to connect said secondary gas source with the compartment, first and second valves disposed respectively in said first and second passageway means, and control means connected with said valves and including an oxygen partial pressure sensitive device, a total pressure rise device, and a total pressure device adapted to be disposed in the compartment, said control means being operable under the control of said partial pressure sensitive device and said total pressure rise device to open and close said first valve respectively on occurrence of a compartment oxygen partial pressure below a preselected level and on occurrence of a preselected compartment total pressure rise following opening of the first valve, and said control means being further operable under the control of said total pressure device to open and close said second valve respectively on occurrence of compartment total pressure below and above preselected low and high levels.

6. The combination in an atrificial atmosphere system as set forth in claim 5 wherein said control means includes means for preventing a simultaneous open condition of said first and second valves.

7. The combination in an artificial atmosphere system as set forth in claim 6 and including counter means operatively connected with said control means for registering openings of said second valve.

8. The combination in an artificial atmosphere system as set forth in claim 7 and including second counter means operatively connected with said control means for registering openings of said first valve.

9. A system adapted to provide a habitable artificial atmosphere in a sealed compartment, said system comprising first and second sources of oxygen under pressure, first and second fluid passageway means respectively adapted to connect said oxygen sources with the compartment, first and second sources of a secondary gas under pressure, third and fourth fluid passageway means respectively adapted to connect said first and second secondary gas sources with the compartment, first and second valves disposed respectively in said first and second passageway means, third and fourth valves disposed respectively in said third and fourth fluid passageway means, and control means connected with all of said first and second valves and including an oxygen partial pressure sensitive device, a total pressure rise device, and a total pressure device adapted to be disposed in the compartment, said control means being operably connected sequentially with said first and second valves under the control of said partial pressure sensitive device and said total pressure rise device, each of said first and second valves when operably connected with said control means being opened and closed thereby respectively on occurrence of a compartment oxygen partial pressure below a preselected level and on occurrence of a preselected compartment total pressure rise following opening of the valve, and said control means also being operably connected sequentially with said third and fourth valves under the control of said total pressure device, each of said third and fourth valves when operably connected with said control means being opened and closed thereby respectively on occurrence of compartment total pressure below and above preselected low and high levels.

10. The combination in an artificial atmosphere system as set forth in claim 9 wherein said control means also includes a means for overriding said oxygen partial pressure sensitive device and preventing opening of either of said first and second valves when either of said third and fourth valves is open.

11. A system adapted to provide a habitable artificial atmosphere in a sealed compartment, said system comprising a source of oxygen under pressure, first fluid passageway means adapted to connect said source with the compartment, a source of a secondary gas under pressure, second fluid passageway means adapted to connect said secondary gas source with the compartment, first and second valves respectively in said first and second passageway means, an oxygen partial pressure sensitive device adapted to be disposed in said compartment and operable to emit a signal when oxygen partial pressure in the compartment drops below a preselected level, a total pressure rise device adapted to be disposed in said compartment and adapted to be actuated and operable thereafter to emit a signal when compartment total pressure has increased a pre-selected increment over the total pressure existing at actuation, and control means connected with said first valve and with said partial and total pressure devices and operable to open said first valve and to actuate said total pressure rise device on receipt of said signal from said partial pressure sensitive device, said control means being further operable to close said first valve on receipt of said signal from said total pressure rise device.

12. A system adapted to provide a habitable artificial atmosphere in a sealed compartment, said system comprising a source of oxygen under pressure, first fluid passageway means adapted to connect said source with the compartment, a source of a secondary gas under pressure, second fluid passageway means adapted to connect said secondary gas source with the compartment, first and second valves disposed respectively in said first and second passageway means, an oxygen partial pressure sensitive device adapted to be disposed in said compartment and operable to emit a signal when oxygen partial pressure in the compartment drops below a preselected level, a total pressure rise device adapted to be disposed in said compartment and adapted to be actuated and operable thereafter to emit a signal when compartment total pressure has increased a preselected increment over the total pressure existing at actuation, a total pressure device adapted to be disposed in said compartment and operable to emit first and second signals respectively when compartment total pressure drops below and exceeds preselected low and high levels, and control means connected with said first and second valves and with said pressure devices and operable to open said first valve and to actuate said total pressure rise device on receipt of said signal from said partial pressure sensitive device, said control means being further operable to close said first valve on receipt of said signal from said total pressure rise device, and said control means being still further operable to open and close said second valve respectively on receipt of said first and second signals from said total pressure device.

13. The combination in an artificial atmosphere system as set forth in claim 12 wherein said control means also includes means for overriding said signal from said oxygen partial pressure sensitive device and preventing opening of said first valve when said second valve is open.

14. The combination in an artificial atmosphere system as set forth in claim 13 and including counter means operatively connected with said control means for registering openings of said second valve.

15. The combination in an artificial atmosphere system as set forth in claim 14 and including second counter means operatively connected with said control means for registering openings of said first valve.

16. The combination in an artificial atmosphere system as set forth in claim 13 wherein said control means includes a means for providing a holding signal on receipt of said signal from said partial pressure sensitive device, said holding signal means serving to maintain said first valve in an open condition until said valve closing signal is received from said total pressure rise device irrespective of the duration of said signal from said partial pressure sensitive device.

17. The combination in an artificial atmosphere system as set forth in claim 13 wherein said control means includes signal transmitting means normally operable to open said first valve on receipt of said signal from said oxygen partial pressure sensitive device, said transmitting means nevertheless being inoperable to maintain said valve in an open condition despite a continuing signal from said partial pressure device when said signal from said total pressure rise device is received by said control means, and said transmitting means being once again operable to open said first valve when said continuing signal has terminated and when a subsequent signal is emitted by said partial pressure device.

References Cited by the Examiner
UNITED STATES PATENTS

| | | | |
|---|---|---|---|
| 2,324,716 | 7/43 | Nohl | 128—191 |
| 2,830,583 | 4/58 | Finney | 128—142 |
| 2,915,059 | 12/59 | Le Masson | 128—142 |
| 2,998,009 | 8/61 | Holm | 128—142 |

MEYER PERLIN, *Primary Examiner.*

ROBERT A. O'LEARY, *Examiner.*

UNITED STATES PATENT OFFICE
CERTIFICATE OF CORRECTION

Patent No. 3,215,057 November 2, 1966

Robert F. Turek

It is hereby certified that error appears in the above numbered patent requiring correction and that the said Letters Patent should read as corrected below.

Column 6, line 27, after "164" insert -- extends to the aforementioned "or" network 158. A --.

Signed and sealed this 16th day of August 1966.

(SEAL)
Attest:

ERNEST W. SWIDER
Attesting Officer

EDWARD J. BRENNE
Commissioner of Patents